(12) United States Patent
Doering et al.

(10) Patent No.: US 9,816,849 B2
(45) Date of Patent: Nov. 14, 2017

(54) DISPENSING APPARATUS AND METHODS UTILIZING QUICK CONNECT MEMBER TO SECURE FLUID BODY AND ACTUATOR BODY

(71) Applicant: Nordson Corporation, Westlake, OH (US)

(72) Inventors: Frederick L. Doering, Providence, RI (US); John D. Jones, Cranston, RI (US)

(73) Assignee: Nordson Corporation, Westlake, OH (US)

( * ) Notice: Subject to any disclaimer, the term of this patent is extended or adjusted under 35 U.S.C. 154(b) by 42 days.

(21) Appl. No.: 14/719,651

(22) Filed: May 22, 2015

(65) Prior Publication Data

US 2016/0341589 A1 Nov. 24, 2016

(51) Int. Cl.
*B65D 88/54* (2006.01)
*G01F 13/00* (2006.01)
(Continued)

(52) U.S. Cl.
CPC ............ *G01F 11/30* (2013.01); *B05B 15/065* (2013.01); *B05C 5/02* (2013.01); *B05C 5/0237* (2013.01);
(Continued)

(58) Field of Classification Search
CPC ........ G01F 11/30; B23P 19/04; B67D 7/0233; B67D 7/0294
(Continued)

(56) References Cited

U.S. PATENT DOCUMENTS

| | | | |
|---|---|---|---|
| 4,352,511 A | 10/1982 | Ribble et al. | |
| 5,467,899 A * | 11/1995 | Miller | B05C 11/1034 222/309 |

(Continued)

FOREIGN PATENT DOCUMENTS

| | | |
|---|---|---|
| GB | 2094429 A | 9/1982 |
| WO | 2005/009627 A2 | 2/2005 |

OTHER PUBLICATIONS

Nordson EFD, Square Wave 745NC Non-Contact Dispense Valve Operating Manual, 2013 (12 pages).
(Continued)

*Primary Examiner* — Jeremy W Carroll
(74) *Attorney, Agent, or Firm* — Baker & Hostetler LLP

(57) ABSTRACT

A fluid dispensing apparatus includes an actuator body with an actuator and a valve stem coupled for movement with the actuator, and a fluid body having a fluid chamber capable of fluid communication with an outlet. The valve stem is adapted to extend from the actuator body into the fluid chamber for dispensing fluid from the fluid chamber through the outlet. A quick connect member is provided to selectively fully engage and disengage a first coupling element on the actuator body with a second coupling element on the fluid body, to connect and disconnect the actuator body and the fluid body with respect to each other. The quick connect member advantageously connects or disconnects these bodies without requiring disassembly or dismounting of the bodies from other elements associated with the fluid dispensing apparatus, with a simple manual movement such as a sliding linear continuous movement.

9 Claims, 8 Drawing Sheets

(51) Int. Cl.
  *G01F 11/30* (2006.01)
  *B67D 7/02* (2010.01)
  *B23P 19/04* (2006.01)
  *B05B 15/06* (2006.01)
  *B05C 5/02* (2006.01)
  *F16L 37/12* (2006.01)

(52) U.S. Cl.
  CPC ............ *B23P 19/04* (2013.01); *B67D 7/0233* (2013.01); *B67D 7/0294* (2013.01); *F16L 37/1225* (2013.01)

(58) Field of Classification Search
  USPC ................................. 222/252, 543, 573, 259
  See application file for complete search history.

(56) References Cited

U.S. PATENT DOCUMENTS

| | | | |
|---|---|---|---|
| 7,762,088 B2 * | 7/2010 | Fiske | ............... B05C 5/001 62/3.64 |
| 8,578,729 B2 | 11/2013 | Fiske et al. | |
| 9,044,584 B2 * | 6/2015 | Monroe | .................. A61B 5/022 |
| 9,347,597 B2 * | 5/2016 | Adeyemi | ............ B25B 27/0028 |
| 9,410,630 B1 * | 8/2016 | Taylor | ..................... F16K 3/243 |
| 2010/0065585 A1 * | 3/2010 | Romanin | .............. B05C 5/0225 222/249 |
| 2012/0227221 A1 * | 9/2012 | Whitaker | ........... A61M 39/1011 24/459 |
| 2013/0048759 A1 * | 2/2013 | Aguilar | ................. B05C 5/0225 239/562 |
| 2013/0320672 A1 * | 12/2013 | Steele | ................. F16L 37/0982 285/305 |

OTHER PUBLICATIONS

European Patent Application No. 16169400.5; Extended Search Report; dated Oct. 24, 2016; 6 pages.

\* cited by examiner

DISPENSING APPARATUS AND METHODS UTILIZING QUICK CONNECT MEMBER TO SECURE FLUID BODY AND ACTUATOR BODY

TECHNICAL FIELD

The present invention generally relates to a fluid dispensing apparatus and, more particularly, to structures and methods for simplifying the assembly and maintenance of a fluid dispensing apparatus.

BACKGROUND

When manufacturing a product, manufacturers may utilize a fluid dispensing apparatus to dispense precise volumes of fluid onto a substrate or workpiece. For example, the dispensed fluid may include viscous material such as solder flux, solder paste, adhesives such as hot melt adhesive, solder mask, thermal compounds, oil, encapsulants, potting compounds, inks, and silicones. Conventionally, the fluid dispensing apparatus includes a fluid body secured to an actuator body via two or more screws, and a moveable valve member that extends from the actuator body into a fluid chamber defined by the fluid body. The fluid chamber communicates with an outlet through which the precise volume of fluid is dispensed.

Prior to a dispensing operation, the fluid dispensing apparatus is typically mounted to an object capable of aiming the outlet at the substrate or workpiece on which to dispense the volume of fluid. In addition, the fluid body is connected to a fluid supply such that fluid in the fluid supply is able to collect in the fluid chamber. In embodiments where the valve member is pneumatically actuated, the actuator body is also connected to a pressurized air source for actuating the valve member. When the fluid dispensing apparatus becomes active, the moveable valve member may be controlled to rapidly move in a reciprocating manner towards and away from the outlet. During the rapid movement towards the outlet, the moveable valve member forces the precise volume of fluid from the fluid chamber through the outlet and onto the substrate or workpiece, thereby "jetting" or otherwise dispensing the precise volume of fluid out of the fluid dispensing apparatus. Of course, other types of opening and closing the valve member can be used in other embodiments. Furthermore, the fluid may be forced from the fluid chamber more by the pressurization applied to the fluid in other similar embodiments.

A fluid dispensing apparatus of the above type has certain drawbacks. For example, replacement, cleaning, or other maintenance of the fluid body of the fluid dispensing apparatus typically entails removing the two or more screws that secure the fluid body to the actuator body. Such screw removal often necessitates a standard or specialized tool and results in additional manufacturing down time. Furthermore, a manufacturer typically needs to dismount the fluid dispensing apparatus (e.g., by removing other connections of the fluid body and/or the actuator body to ancillary equipment such as a nozzle, a pressurized air source, a mounting device, etc.) to access the screws, which further increases manufacturing down time and may necessitate additional tools. Accordingly, any necessary maintenance or cleaning of the fluid body requiring significant upfront labor just to start the process in these conventional designs.

Therefore, it is desirable to provide a fluid dispensing apparatus that overcomes these and other deficiencies of a conventional fluid dispensing apparatus, as described herein.

SUMMARY

In one embodiment, an apparatus for dispensing a fluid from a fluid supply includes an actuator body, an actuator at least partially mounted within the actuator body, and a valve stem coupled for movement with the actuator. The apparatus further includes a fluid body that has a fluid chamber capable of fluid communication with the fluid supply and with an outlet. The valve stem extends from the actuator body into the fluid chamber when the actuator body and the fluid body are connected, to dispense the fluid from the fluid chamber through the outlet. The actuator body includes a first coupling element thereon, and the fluid body includes a second coupling element thereon. A quick connect member is configured to selectively fully engage and fully disengage the first and second coupling elements with one another, to thereby connect and disconnect the actuator body and the fluid body with respect to each other.

In one aspect, the quick connect member includes a slidable element adapted to engage the first and second coupling elements. In addition, the quick connect member may be configured to engage the first and second coupling elements in response to a first movement of the slidable element from a first position to a second position. The quick connect member may also be configured to disengage the first and second coupling elements in response to a second movement of the slidable element from the second position to the first position. In some aspects, each of the first movement and the second movement is generally linear and continuous.

In yet another aspect, the slidable element is U-shaped and includes an open end and a closed end. The open end is adapted to receive the first and second coupling elements. The quick connect member may also include a handle extending from the closed end of the slidable element. The handle is operative to facilitate engagement and disengagement of the quick connect member with the first and second coupling elements by hand.

In an additional aspect, the slidable element includes an interior extending between the open end and the closed end, the interior delimited by an upper tongue and a lower tongue. The upper tongue and the lower tongue are adapted to engage the first and second coupling elements, respectively. In addition, each of the first coupling element and the second coupling element may include a beveled surface or groove adapted to contact the upper tongue and the lower tongue of the slidable element respectively.

In a further aspect, at least one of the first and second coupling elements includes a bore, and the closed end of the slidable element includes an aperture. The quick connect member further includes a threaded fastener extending through the aperture into the interior of the slidable element. The bore is operable to receive the threaded fastener to further secure the quick connect member to the at least one of the first and second coupling elements when the quick connect member is engaged with the first and second coupling elements. The threaded fastener may include a handle operable by hand and a pin having a proximal end connected to the handle. The pin may further include a distal end, and the aperture may be operative to enable the distal end of the pin to extend into the interior of the slidable element while preventing the handle from entering the interior of the slidable element.

In another aspect, at least one of the first coupling element and the second coupling element includes a biasing member adapted to bias the fluid body away from the actuator body when the quick connect member is engaged. Additionally, at least one of the upper tongue and the lower tongue of the slidable element may include a detent adapted to compress the biasing member during movement of the quick connect member between a first position, in which the quick connect member is engaged with the first and second coupling elements, and a second position, in which the quick connect member is disengaged from the first and second coupling elements, thereby increasing frictional resistance to the movement of the quick connect member.

In a further aspect, at least one of the first coupling element and the second coupling element includes a stopper, and the other of the first coupling element and the second coupling element includes a mating structure that has at least one of distinct sides and distinct protrusions. One of the sides or protrusions is positioned adjacent and/or in contact with the stopper when the quick connect member is engaged, so as to prevent the actuator body and the fluid body from rotating relative to each other while the quick connect member is engaged.

In another embodiment, a method for connecting and disconnecting an actuator body and a fluid body of a fluid dispensing apparatus includes assembling the actuator body with the fluid body at least in part by inserting a valve stem extending from the actuator body into a fluid chamber of the fluid body. In addition, the method includes approximating a first coupling element on the actuator body with a second coupling element on the fluid body. The method further includes engaging a quick connect member with the first and second coupling elements to fully engage the first and second coupling elements together, thereby to connect the actuator body and the fluid body to each other; and disengaging the quick connect member from the first and second coupling elements to disconnect the actuator body and the fluid body from each other.

In one aspect, engaging the quick connect member with the first and second coupling elements includes rotating, by hand, a threaded fastener operable to secure the quick connect member to a bore provided in at least one of the first coupling element and the second coupling element, and sliding the quick connect member in a linear movement towards the first and second coupling elements. Similarly, disengaging the quick connect member with the first and second coupling elements may include sliding the quick connect member in a linear direction away from the first and second coupling elements and rotating the threaded fastener by hand.

These and other objects and advantages of the invention will become more readily apparent during the following detailed description taken in conjunction with the drawings herein.

DETAILED DESCRIPTION

Figure 1:
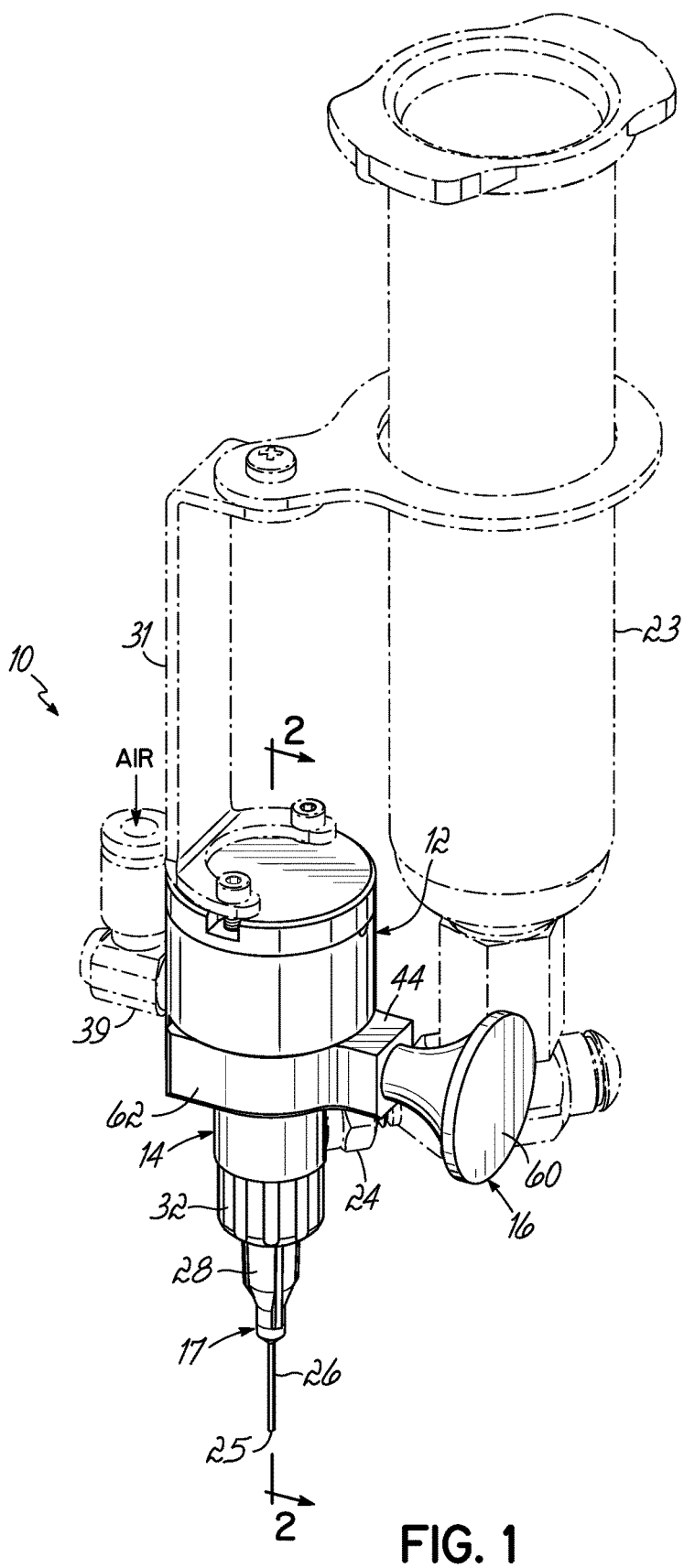
FIG. 1 is a perspective view of a fluid dispensing apparatus that includes a quick connect member in accordance with one embodiment.
Figure 2:
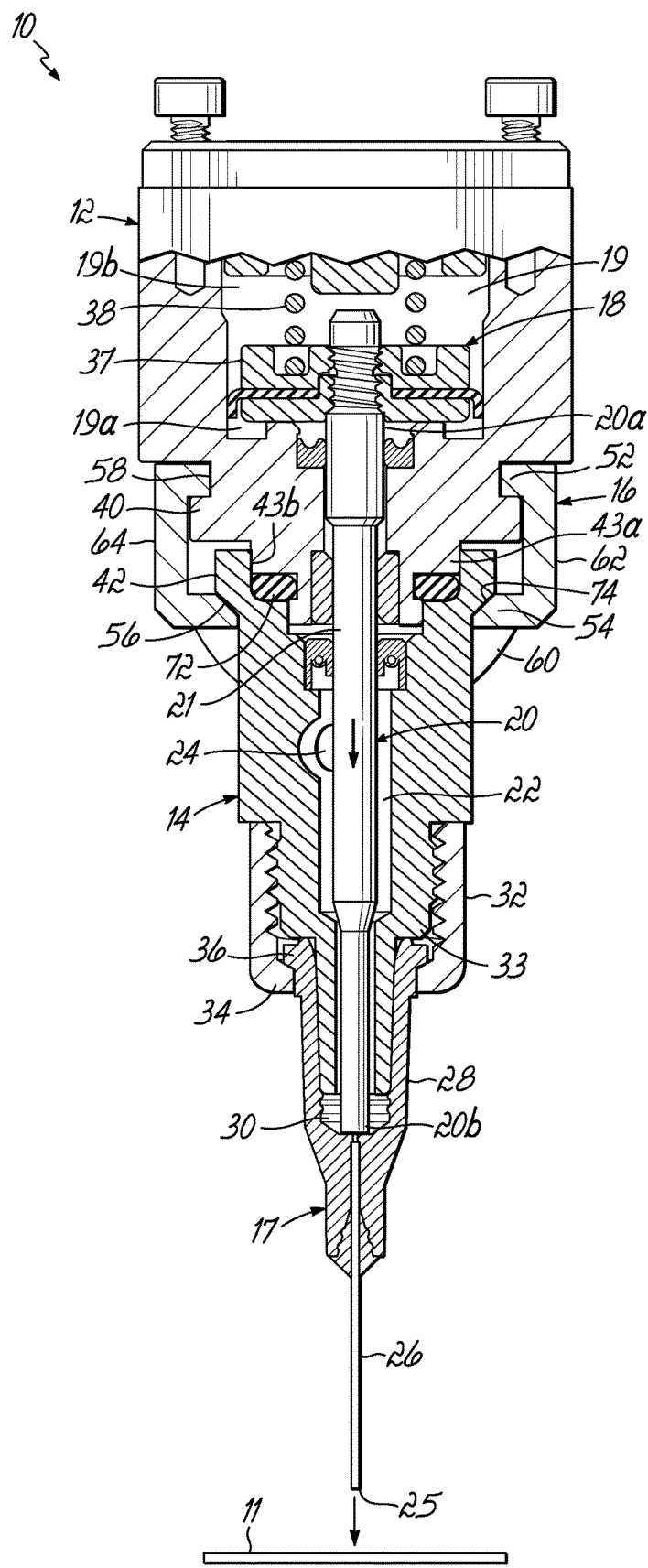
FIG. 2 is a cross-sectional view of the fluid dispensing apparatus taken generally along line 2-2 of FIG. 1.

FIGS. 1 and 2 illustrate a fluid dispensing apparatus 10 in accordance with one embodiment of the current invention that is operable to dispense fluid onto a substrate or workpiece 11. The fluid dispensing apparatus 10 includes an actuator body 12, a fluid body 14, and a quick connect member 16 (or clasp) that connects the actuator body 12 and the fluid body 14. More particularly, the quick connect member 16 is configured to selectively fully engage and disengage the actuator body 12 and the fluid body 14 at corresponding first and second coupling elements (described below) to respectively connect and disconnect the actuator body 12 and the fluid body 14 with respect to each other. The quick connect member 16 of the fluid dispensing apparatus 10 advantageously enables rapid connection and disconnection of the actuator body 12 and the fluid body 14 to reduce manufacturing downtime caused during replacing components, cleaning, or performing other maintenance on the actuator body 12 or the fluid body 14.

For example, the fluid dispensing apparatus 10 may be configured so that generally straightforward movements of the quick connect member 16, such as a linear sliding movement, cause the actuator body 12 and the fluid body 14 to connect and disconnect with respect to each other. Moreover, the quick connect member 16 may be operable by hand so as to enable performance of the connection and disconnection without a specialized or standard tool. The quick connect member 16 may also be readily accessible for movement notwithstanding whether the fluid dispensing apparatus 10 is in a mounted position relative to any or all of a fluid supply, a pressurized air source, a nozzle, and a mounting apparatus capable of aiming the outlet of the fluid dispensing apparatus 10 at the substrate 11. These and other features of the fluid dispensing apparatus 10, further described below, reduce time spent disconnecting and connecting the actuator body 12 and the fluid body 14, and thereby reduce total manufacturing down time each time such a disconnection or connection is needed.

Returning to FIGS. 1 and 2, the fluid dispensing apparatus 10 further includes a nozzle 17 through which the fluid is dispensed onto the substrate or workpiece 11. The nozzle 17 is operatively coupled to the fluid body 14. The fluid dispensing apparatus 10 further includes an actuator 18 that is at least partially positioned in an air chamber 19 of the actuator body 12, and a valve stem 20 coupled for movement with the actuator 18. More particularly, the valve stem 20 includes a proximal end 20*a* and a distal end 20*b*, where the proximal end 20*a* is connected to the actuator 18 within the air chamber 19. The valve stem 20 extends axially within the air chamber 19 from the actuator 18 and through an opening 21 in a bottom portion of the actuator body 12. When the actuator body 12 and the fluid body 14 are connected such as via the quick connect member 16, the valve stem 20 extends from the opening 21 into a fluid chamber 22 of the fluid body 14. During operation of the fluid dispensing apparatus 10, which is described in more detail below, the actuator 18 causes axial reciprocating movement of the valve stem 20 within the fluid chamber 22. This axial reciprocating movement opens and closes the valve, which selectively enables fluid in the fluid chamber 22 to dispense through the nozzle 17.

To this end, the fluid chamber 22 of the fluid body 14 is capable of communicating with a fluid supply 23 (shown in phantom in FIG. 1), such as via an inlet port 24. The fluid supply 23 includes fluid to be dispensed onto the substrate or workpiece 11. In one example, the fluid supply 23 is adapted to supply fluid to the fluid chamber 22 under pressure. The fluid supply 23 may include any one of a wide variety of fluids. For example, the fluid may include viscous material such as solder flux, solder paste, adhesives, solder mask, thermal compounds, oil, encapsulants, potting compounds, inks, silicones, and/or the like.

The nozzle 17 is operatively coupled to the fluid body 14 such that the fluid chamber 22 is in fluid communication with an outlet 25 of the nozzle 17. In the illustrated embodiment, the nozzle 17 includes a nozzle body 28 and a needle 26, which defines the outlet 25, that is partially mounted within the nozzle body 28. The nozzle 17 further includes a valve seat 30 that is positioned within the nozzle body 28 adjacent to an end of the needle 26 that is opposite the outlet 25. When the fluid dispensing apparatus 10 is assembled, the valve seat 30 is adapted to contact and thereby form a sealing engagement with the distal end 20*b* of the valve stem 20, at least when the valve stem 20 is located in an extended or closed position.

In the illustrated embodiment, a nozzle cap 32 is configured to threadably engage an outer surface 33 of the fluid body 14 to releasably secure the nozzle 17 thereto. The nozzle cap 32 includes a radially inward shoulder structure 34 operable to engage a bottom surface of an enlarged positioning rim 36 that is coupled to or defined by the nozzle body 28. In this way, when the nozzle cap 32 is threadably engaged with the outer surface 33 of the fluid body 14, the positioning rim 36 is sandwiched firmly between the radially inward shoulder structure 34 and the outer surface 33 of the fluid body 14.

Prior to becoming active, the fluid dispensing apparatus 10 may be mounted to an object, such as mounting apparatus 31 (shown in phantom in FIG. 1), that is capable of aiming the outlet 25 towards the substrate or workpiece 11 on which to dispense the fluid. In the illustrated embodiment, the fluid dispensing apparatus 10 is mounted to the mounting apparatus 31 via the actuator body 12, such as by using threaded fasteners. Although the fluid dispensing apparatus 10 has been described herein in accordance with one or more embodiments, it will be appreciated that the fluid dispensing apparatus 10 may have any other alternative mechanisms and components for aiming the outlet 25 while dispensing the fluid.

Operation of the fluid dispensing apparatus 10 will now be described. When the fluid dispensing apparatus 10 is assembled and at rest, which is illustrated in FIGS. 1 and 2, the actuator 18 biases the valve stem 20 towards the nozzle 17 and thereby causes the distal end 20*b* of the valve stem 20 to form a sealing engagement with the valve seat 30. This sealing engagement prevents fluid in the fluid chamber 22 from moving towards the outlet 25 when the fluid dispensing apparatus 10 is at rest.

During a dispensing cycle, the actuator 18 selectively causes the valve stem 20 to move away from nozzle 17, which eliminates the sealing engagement and thereby enables fluid in the fluid chamber 22 to flow towards and through the valve seat 30. Subsequently, the actuator 18 causes the valve stem 20 to move back towards the nozzle 17 until the distal end 20*b* contacts the valve seat 30. Such movement closes the flow of fluid through the valve, and may also force some fluid that has flowed adjacent to the valve seat 30 through the valve seat 30, into the needle 26, and out through the outlet 25 onto the substrate or workpiece 11 being manufactured. For example, the fluid ejected from the outlet 25 may define a droplet.

In one embodiment, the actuator 18 is a spring return pneumatic actuator including a piston assembly 37 and at least one spring 38, both of which are positioned within the air chamber 19, and a pneumatic system (not shown) including a pressurized air source configured to provide air pressure, such as through an air inlet port 39 (shown in phantom in FIG. 1), into the air chamber 19. Under this configuration, the valve stem 20 extends from a bottommost surface of the piston assembly 37, and the spring 38 engages a topmost surface of the piston assembly 37 to bias the piston assembly 37 towards the nozzle 17. Consequently, when the fluid dispensing apparatus 10 is at rest, the valve stem 20 is also biased towards the nozzle 17 such that the distal end 20*b* of the valve stem 20 contacts and forms the sealing engagement with the valve seat 30.

When the fluid dispensing apparatus 10 becomes active, the pneumatic system provides air pressure to move the piston assembly 37 away from the nozzle 17. For example, the pneumatic system may selectively introduce pressurized air via air inlet port 39 into a lower portion 19*a* of the air chamber 19 that is below the piston assembly 37, the control thereof provided in one example by a solenoid that controls the supply of pressurized air into passages (not shown) leading to the lower portion 19*a* of the air chamber 19. When pressurized air flows into the lower portion 19*a*, the air applies force on the bottom of the piston assembly 37 that overcomes the spring bias and moves the piston assembly 37 in an axial direction away from the nozzle 17. This movement causes the distal end 20*b* of the valve stem 20 to separate from the valve seat 30.

As the piston assembly 37 moves in the axial direction away from the nozzle 17, it bears against and further compresses the spring 38. When the pneumatic system ceases to provide air pressure into the lower portion 19*a* of the air chamber 19, this enables the spring 38 to once again press against the topmost surface of the piston assembly 37 to move the piston assembly 37 in an axial direction towards the nozzle 17. It will be understood that an upper portion 19*b* of the air chamber 19 that is above the piston assembly 37 may communicate with an opening that vents to ambient atmosphere in some embodiments to allow free movement of the piston assembly 37 without needing to overcome air compression or vacuum forces within the air chamber 19. Alternatively, the pneumatic system may selectively introduce pressurized air into the upper portion 19*b* of the air chamber 19 when the fluid dispensing apparatus 10 is at rest, to assist the spring 38 in moving the piston assembly 37 towards the nozzle 17. Regardless of the particular embodiment chosen, the return and movement of the valve stem 20 towards the nozzle 17 causes closing of flow through the valve, and in some embodiments, may also contribute to causing the fluid discharge via the valve seat 30, into the needle 26, and out through the outlet 25 onto the substrate or workpiece 11, as described briefly above.

In alternative embodiments, the actuator 18 may include a piezo-electric actuator, a solenoid actuator, a voice coil actuator, a mechanical motor actuator or any other type of actuator suitable for facilitating controlled, reciprocating movement of the valve stem 20 between the positions described above. The actuator 18 may further include one or more springs 38 in combination with any of these alternative actuator types to bring the valve stem 20 towards one of the positions.

Figure 3A:
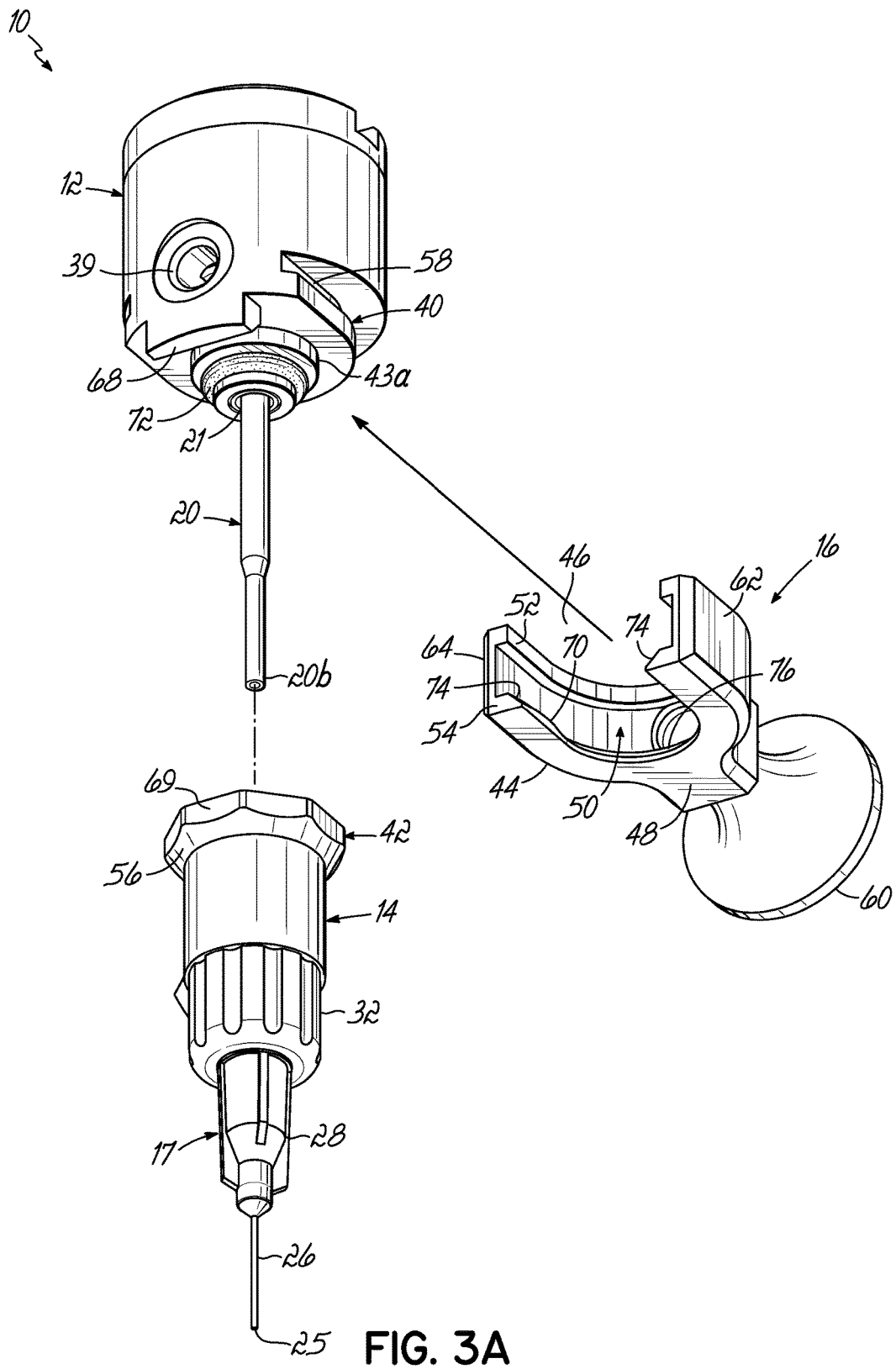
FIG. 3A is a partially disassembled view of the fluid dispensing apparatus of FIG. 1.
Figures 3B, 3C:
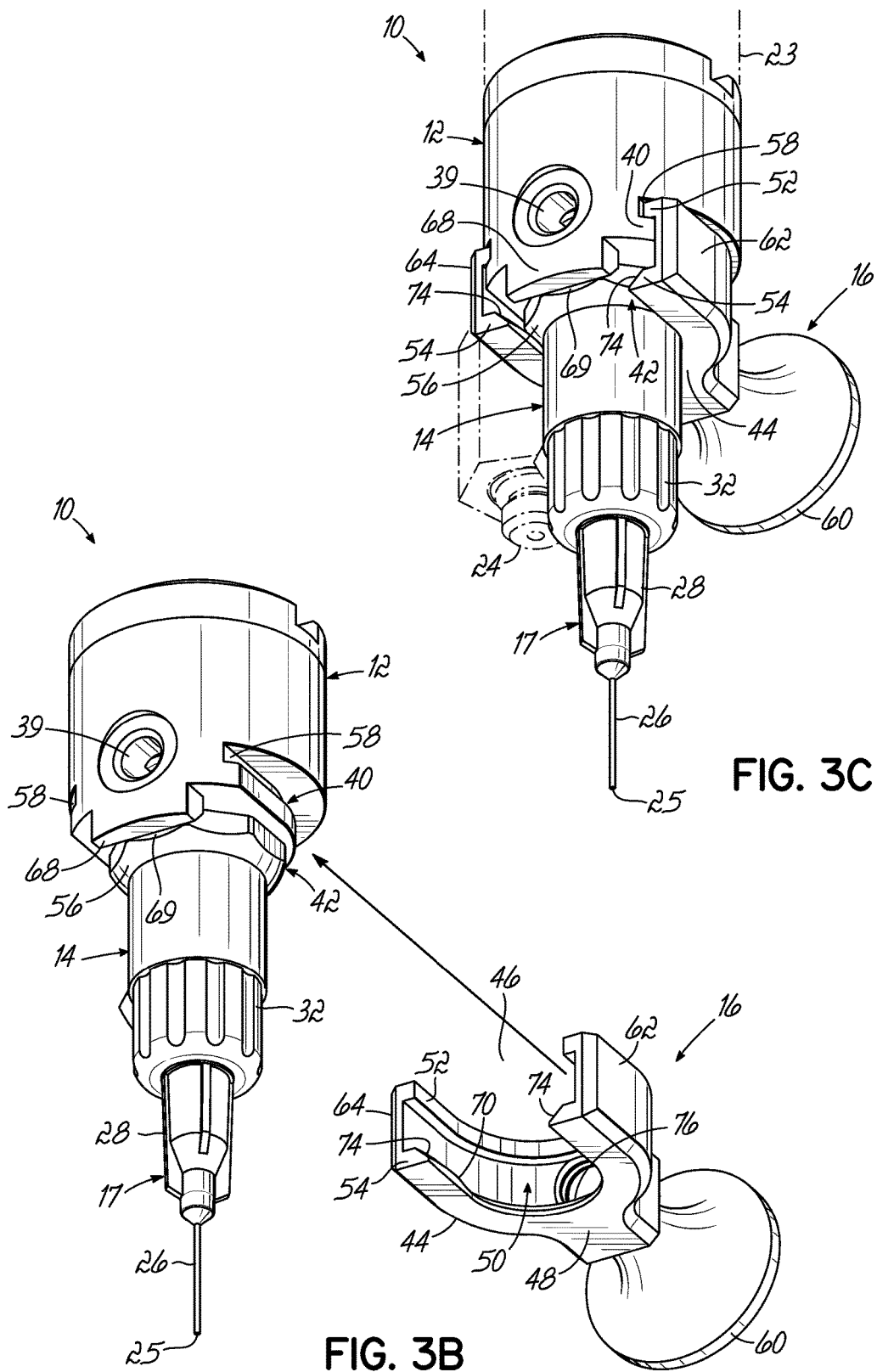
FIG. 3B is a view similar to FIG. 3A, but showing first and second coupling members on the fluid body and the actuator body of the fluid dispensing apparatus being approximated so that the quick connect member is ready to engage these coupling elements.
FIG. 3C is a view similar to FIG. 3B, but showing the quick connect member fully engaging the first and second coupling elements.

FIGS. 3A-3C illustrate in further detail an exemplary connection according to this embodiment of the actuator body 12 and the fluid body 14 using the quick connect member 16. Referring to FIG. 3A, the actuator body 12 includes a coupling element 40, and the fluid body 14 includes a coupling element 42. The quick connect member 16 is configured to selectively fully engage and disengage the coupling elements 40, 42 with each other to connect and disconnect the actuator body 12 and the fluid body 14 with respect to each other. Such connection and disconnection may occur without first dismounting the fluid dispensing apparatus 10, if mounted, and without first removing the nozzle 17 from the fluid dispensing apparatus 10. To this end, the other ancillary structures connected to the fluid dispensing apparatus 10 do not necessarily need to be removed prior to disconnection of the actuator body 12, the fluid body 14 with quick connect member 16.

In one embodiment, when connecting the fluid body 14 and the actuator body 12 via the quick connect member 16, the actuator body 12 is initially assembled with the fluid body 14 at least in part by inserting the portion of the valve stem 20 extending from the actuator body 12 into the fluid chamber 22 of the fluid body 14. More particularly, the portion of the valve stem 20 extending from the actuator body 12 extends through the coupling element 40, and this portion is inserted through the coupling element 42 into the fluid chamber 22. When connecting the fluid body 14 and the actuator body 12, the coupling elements 40, 42 are also approximated with respect to one another so that they are close enough in proximity and axial alignment to enable engagement by the quick connect member 16. The insertion of the valve stem 20 through the coupling element 42 and into the fluid chamber 22 helps keep the coupling elements 40, 42 in general alignment before, during, and after the quick connect member 16 is engaged.

At least one of the coupling elements 40, 42 may further include an alignment guide 43a closely conforming to an opening 43b (FIG. 2) in the other of the coupling elements 40, 42. In this way, when the coupling elements 40, 42 are approximated with one another, the alignment guide 43a may be received in the opening 43b so as to help maintain the coupling elements 40, 42, and consequently the actuator body 12 and the fluid body 14, in proper axial alignment before, during, and after the quick connect member 16 is engaged.

Referring to FIG. 3B, once the actuator body 12 and the fluid body 14 have been assembled, and the coupling elements 40, 42 have been approximated with respect to one another, the quick connect member 16 can be moved to engage the coupling elements 40, 42 to connect the fluid body 14 and the actuator body 12. In one embodiment, the quick connect member 16 includes a slidable element 44 adapted to engage the coupling elements 40, 42. The quick connect member 16 may be configured to fully engage the coupling elements 40, 42, with one another (e.g., placed in substantial face-to-face contact with one another) and thereby connect the fluid body 14 and the actuator body 12 for use in a manufacturing operation, in response to a continuous movement of the slidable element 44 from a position in which the slidable element 44 is disengaged from the coupling elements 40, 42 (as shown in FIGS. 3A and 3B) to a position in which the slidable element 44 is engaged with the coupling elements 40, 42 (as shown in FIG. 3C). In this way, multiple discrete and/or complex movements of the quick connect member 16, such as multiple turns of several screws or other pieces, are not necessary in this embodiment to connect (or disconnect) the actuator body 12 and the fluid body 14. The continuous movement of the quick connect member 16 may be linear and may be in a direction generally perpendicular to the shared longitudinal axis of the actuator body 12 and the fluid body 14, as shown in this embodiment.

In some embodiments, the slidable element 44 is U-shaped and includes an open end 46 and a closed end 48. The open end 46 is adapted to receive the coupling elements 40, 42 when the quick connect member 16 is moved to connect the actuator body 12 and the fluid body 14. The slidable element 44 may further include an interior 50 extending between the open end 46 and the closed end 48, the interior 50 delimited by an upper tongue 52 and a lower tongue 54 that are adapted to engage the coupling elements 40, 42, respectively. More particularly, each of the coupling elements 40, 42 may define a lip 56 or a groove 58 corresponding to the upper tongue 52 or the lower tongue 54 so as enable contact with the upper tongue 52 or the lower tongue 54 during engagement of the quick connect member 16. In the illustrated embodiment, for example, the groove 58 corresponds to the shape of the upper tongue 52 so as to receive the upper tongue 52 therein, and the lip 56 may include a beveled surface to correspond to an interior beveled surface 76 of the lower tongue 54, described further below. These complementary features of the coupling elements 40, 42 and of the quick connect member 16 ensure proper positioning and alignment during connection of the fluid body 14 and the actuator body 12.

The closed end 48 of the slidable element 44 may include a handle 60 extending therefrom that facilitates movement of the quick connect member 16 for engagement and disengagement with the coupling elements 40, 42. In general, the handle 60 is large enough to enable a user to connect or disconnect the fluid body 14 and the actuator body 12 by hand without a specialized or standard tool. Alternatively, if the handle 60 is omitted, a user may grasp opposing external surfaces 62, 64 of the quick connect member 16 by hand to connect or disconnect the actuator body 12 and the fluid body 14.

FIG. 3C provides an illustration of the fluid dispensing apparatus 10 when the quick connect member 16 is engaged with the coupling elements 40, 42 to connect the actuator body 12 and the fluid body 14. In this embodiment, one of the coupling elements 40, 42 includes a stopper 68 adapted to prevent the actuator body 12 and the fluid body 14 from rotating relative to each other when the quick connect member 16 is fully engaged with the coupling elements 40, 42. The stopper 68 of one of the coupling elements 40, 42 may be positioned adjacent to and/or in contact with a flat surface and/or a protrusion on a rotationally symmetric structure included on the other of the coupling elements 40, 42. For example, in the illustrated embodiment, the coupling element 40 on the actuator body 12 includes the stopper 68, and the coupling element 42 on the fluid body 14 includes a mating structure 69 (best shown in FIG. 3A) facing radially outward. When the actuator body 12 and the fluid body 14 are connected via the quick connect member 16, the stopper 68 is positioned adjacent to one of the distinct sides located on the mating structure 69, and consequently any rotation of the actuator body 12 or the fluid body 14 relative to the other is prevented by the contact between the stopper 68 and mating structure 69. The mating structure 69 of this embodiment is generally polygonal, but it will be understood that other types of structures, including rotationally symmetrical structures, which have distinct protrusions for engaging the stopper 68 instead of distinct sides, may be used in other embodiments consistent with the scope of this disclosure.

The stopper 68 may further function to keep the coupling elements 40, 42 in proper alignment before, during, and after the quick connect member 16 is engaged. More particularly, the stopper 68 on one of the coupling elements 40, 42 may prevent the other of the coupling elements 40, 42 from moving laterally in the direction of the stopper 68 when the coupling elements 40, 42 are approximated with one another, and also after the quick connect member 16 is engaged. It will be understood that other similar types of complementary blocking structures for preventing relative rotation of the actuator body 12 and the fluid body 14 may be provided in other embodiments.

Although FIGS. 3A-3C are described herein in the context of connecting the actuator body 12 and the fluid body 14 via the quick connect member 16, it will be appreciated that disconnecting the fluid body 14 and the actuator body 12 includes substantially the reverse of the sequence described above and shown in FIGS. 3A-3C. In other words, disconnecting the actuator body 12 and the fluid body 14 may include disengaging the quick connect member 16 from the coupling elements 40, 42. The quick connect member 16 may be configured to fully disengage the coupling elements 40, 42, and thereby enable the fluid body 14 and the actuator body 12 to be freely separated with respect to one another, in response to a continuous movement of the quick connect member 16 from the position in which the quick connect member 16 is engaged with the coupling elements 40, 42 to the position in which the quick connect member 16 is disengaged from the coupling elements 40, 42. The continuous movement may be linear and may be in a direction perpendicular to the shared axis of the actuator body 12 and the fluid body 14, just like the movement used to connect the elements together.

Figure 4:
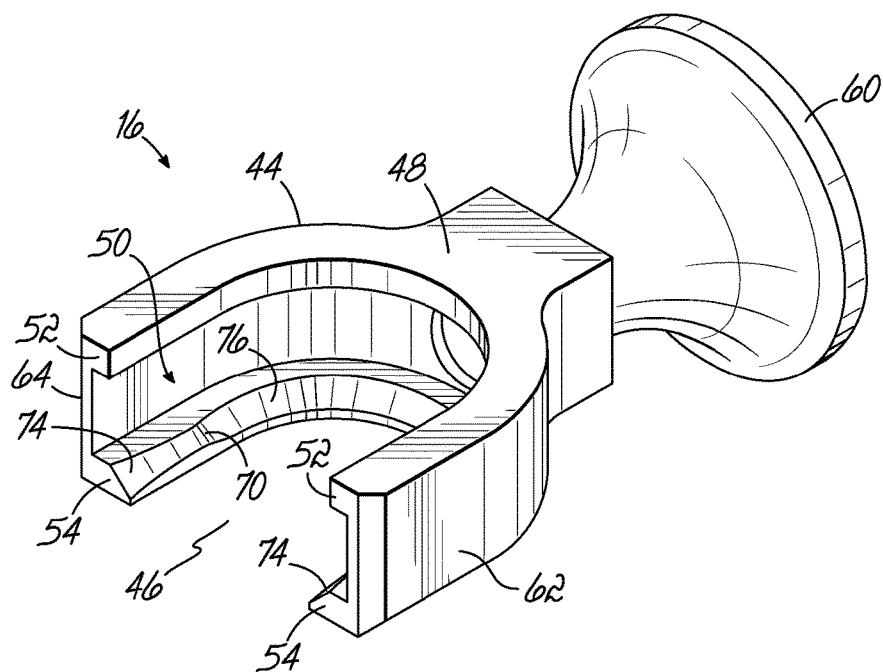
FIG. 4 is a perspective view of the quick connect member of FIG. 1.
Figure 5:
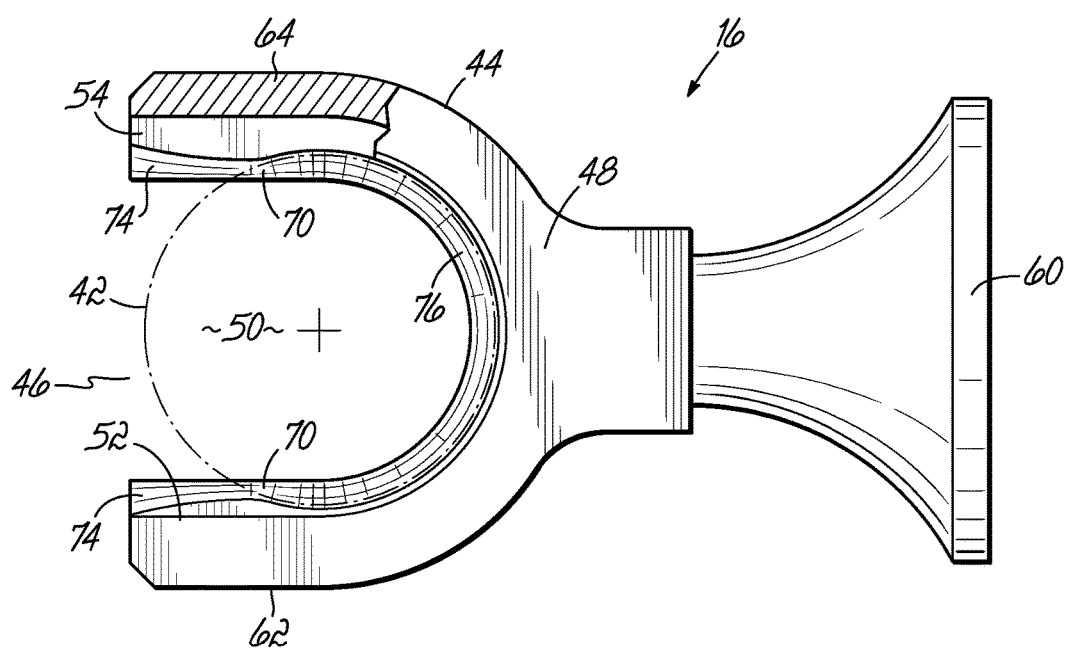
FIG. 5 is a top view of the quick connect member of FIG. 4 with a portion removed for clarity.

Referring now to FIGS. 4 and 5, the quick connect member 16 may include one or more detents 70 positioned on at least one of the upper tongue 52 and the lower tongue 54. The detents 70 are configured to compress a biasing member 72 (FIGS. 2 and 3A), such as a spring or an O-ring seal, included on at least one of the coupling elements 40, 42 when the quick connect member 16 moves to engage or disengage the coupling elements 40, 42. The biasing member 72 may be retained by a groove formed in the alignment guide 43a and likewise may be received in the opening 43b when the coupling elements 40, 42 are approximated with one another. In this way, when the coupling elements 40, 42 are approximated with each other before being engaged by the quick connect member 16, the biasing member 72 biases each of the coupling elements 40, 42 away from one another. Thereafter, when the quick connect member 16 is moved from the position in which the quick connect member 16 is disengaged from the coupling elements 40, 42 to the position in which the quick connect member 16 is engaged with the coupling elements 40, 42, the detents 70 are adapted to cause a compression of the biasing member 72 during at least a portion of the movement.

More particularly, when the quick connect member 16 is moved to engage or disengage the coupling elements 40, 42, the detents 70 cause a compression of the biasing member 72 upon their contact with at least one of the coupling elements 40, 42. As a result, the frictional resistive force between the coupling elements 40, 42 and the quick connect member 16 increases, which consequently increases the amount of force that need be applied to the quick connect member 16 to complete full engagement of the coupling elements 40, 42. In response to the coupling elements 40, 42 overcoming the detents 70, the biasing member 72 is able to expand slightly, which biases the fluid body 14 and the actuator body 12 away from each other such that the coupling elements 40, 42 push up against the upper tongue 52 and down against the lower tongue 54, respectively, to thereby frictionally maintain the coupling elements 40, 42 in position. In the illustrated embodiment, the lip 56 of the coupling element 42 is beveled and corresponds to the interior beveled surface 76 positioned on the lower tongue 54 between the detents 70 and the closed end 48. In this way, after engagement of the quick connect member 16 is complete, the biasing member 72 pushes against the coupling element 42 so as to cause the beveled surface of the lip 56 to sit on the beveled surface 76 of the quick connect member 16.

Once the quick connect member 16 is fully engaged as shown in FIG. 3C, the detents 70 and biasing member 72 effectively serve to secure or lock the coupling elements 40, 42 within the quick connect member 16. More particularly, when the quick connect member 16 is moved to disengage the coupling elements 40, 42, the biasing member 72 and detents 70 necessitate that sufficient force is applied to the quick connect member 16 to overcome the additional resistance caused by moving the coupling elements 40, 42 over the detents 70 against the bias of the biasing member 72. In this way, when the quick connect member 16 is fully engaged with the coupling elements 40, 42, the risk that the quick connect member 16 inadvertently disengages the coupling elements 40, 42 is reduced because sufficient force is needed before the quick connect member 16 will disengage.

In one exemplary embodiment, the actuator body 12 is mounted to the mounting apparatus 31 before the fluid body 14 is connected thereto. Consequently, when the quick connect member 16 is moved to engage the coupling elements 40, 42, the position of the actuator body 12 remains generally fixed relative to its vertical axis while the fluid body 14 moves along this vertical axis relative to the movement of the quick connect member 16. Specifically, when the fluid body 14 is approximated with the actuator body 12, the biasing member 72 initially biases the fluid body 14 away from the actuator body 12. Thereafter, when the quick connect member 16 is moved to engage the coupling elements 40, 42, the detents 70 contact at least one of the coupling elements 40, 42 and cause the biasing member 72 to compress, which consequently causes the fluid body 14 to move toward the actuator body 12. Once the coupling elements 40, 42 move beyond and overcome the detents 70, the biasing member 72 is able to expand slightly, which causes the fluid body 14 to move slightly away from the actuator body 12 such that the lip 56 sits in the beveled surface 76 of the quick connect member 16. The fluid body 14 may thereafter be disconnected from the actuator body 12 without dismounting the actuator body 12 from the mounting apparatus 31 by disengaging the quick connect member 16 from the coupling elements 40, 42.

At least one of the upper tongue 52 or the lower tongue 54 may further include one or more entry beveled or angled surfaces 74 that are adjacent to the open end 46 of the slidable element 44. In addition, at least a portion of the lip 56 or the groove 58 may be beveled or angled to correspond to the entry beveled or angled surfaces 74. For example, in the illustrated embodiment, the lip 56 is beveled or angled to correspond to the entry beveled or angled surfaces 74 of the quick connect member 16. Therefore, in the illustrated embodiments, the parts of the lower tongue 54 that engage the lip 56 are the entry beveled or angled surfaces 74, followed by the raised detents 70, followed by the interior beveled surface 76.

The entry beveled or angled surfaces 74, and/or the beveled or angled portion of the lip 56 or the groove 58, enable the quick connect member 16 to sufficiently draw together the coupling elements 40, 42 into full engagement with one another even when they are not fully mated or approximated with one another upon initial engagement of the quick connect member 16, the risk of which increases with the presence of the biasing member 72. For example, when the coupling elements 40, 42 are approximated with one another, the biasing member 72, which is positioned therebetween, may make it difficult to maintain a distance between the groove 58 and the lip 56 that is equal to the distance between the upper tongue 52 and the lower tongue 54 of the quick connect member 16 for the purposes of engagement. However, even if the coupling elements 40, 42 are not sufficiently approximated before the quick connect member 16 begins to engage, as long as they are close enough in proximity, the entry beveled or angled surfaces 74, and/or the beveled or angled portion of the lip 56 or the groove 58, may function to draw the coupling elements 40, 42 together until they are sufficiently approximated and can receive the rest of the quick connect member 16.

FIGS. 6A through 8 illustrate another embodiment of a fluid dispensing apparatus 10a that includes an actuator body 12a, a fluid body 14a, and a quick connect member 16a. The fluid dispensing apparatus 10a is similar in construction to the fluid dispensing apparatus 10 illustrated in FIGS. 1 through 5, except as otherwise described below. In that regard, similar reference numerals refer to similar or identical features shown and described in connection with the previous embodiment of FIGS. 1 through 5 (slightly modified elements use the same reference number with an "a" suffix).

Figure 6A:
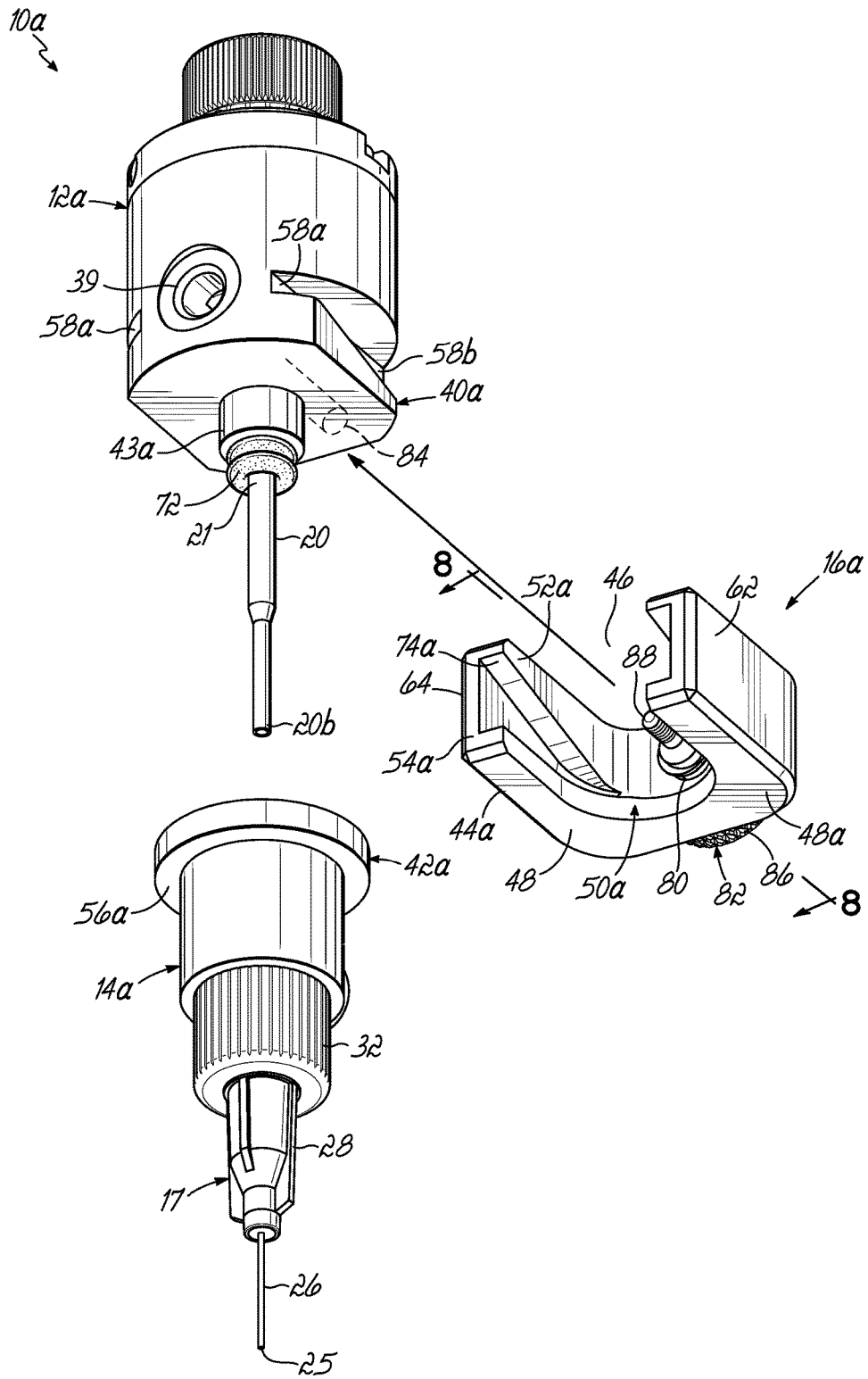
FIG. 6A is a partially disassembled view of a fluid dispensing apparatus that includes a quick connect member in accordance with another embodiment.

Referring to FIG. 6A, the quick connect member 16a of this embodiment further includes an aperture 80 in the closed end 48a of the slidable element 44a, and a threaded fastener in the form of a bolt 82 extends through the aperture 80 into the interior 50a of the slidable element 44a. Furthermore, one of the coupling elements 40a, 42a on the actuator body 12a and the fluid body 14a further includes a bore 84 operable to receive the bolt 82. In this way, when the quick connect member 16a is moved to engage the coupling elements 40a, 42a, the bore 84 receives the bolt 82 of the quick connect member 16a to further secure the quick connect member 16a to the coupling element 40a, 42a that includes the bore 84. Thus, once engaged, the quick connect member 16a is secured to one of the coupling elements 40a, 42a via the bolt 82, and the upper tongue 52a and the lower tongue 54a of the quick connect member 16a hold the coupling elements 40a, 42a in proximity to one another. And, similar to the fluid dispensing apparatus 10 of the previous embodiment, the valve stem 20 and/or the alignment guide 43a may keep the coupling elements 40a, 42a from moving out of alignment with respect to one another before, during, and after the quick connect member 16a is engaged.

In this embodiment, the coupling element 40a includes a wedge-shaped groove 58a, and the coupling element 42a includes a flat lip 56a. The groove 58a and the lip 56a correspond to the upper tongue 52a and the lower tongue 54a of the quick connect member 16a such that, when the quick connect member 16a is moved to engage the coupling elements 40a, 42a, the upper tongue 52a is received in the groove 58a and lip 56a sits on the lower tongue 54a. Similar to the fluid dispensing apparatus 10, the wedged shape of the groove 58a and the corresponding shape of the upper tongue 52a enables the quick connect member 16a to begin engaging the coupling elements 40a, 42a even if the coupling elements 40a, 42a are not sufficiently approximated. More particularly, the upper tongue 52a of the quick connect member 16a includes a beveled or angled surface 74a, and the groove 58a similarly includes a beveled or angled portion 58b. The surface 74a and/or the portion 58b function to draw the coupling elements 40a, 42a together as the upper tongue 52a is received in the groove 58a.

Figure 6B:
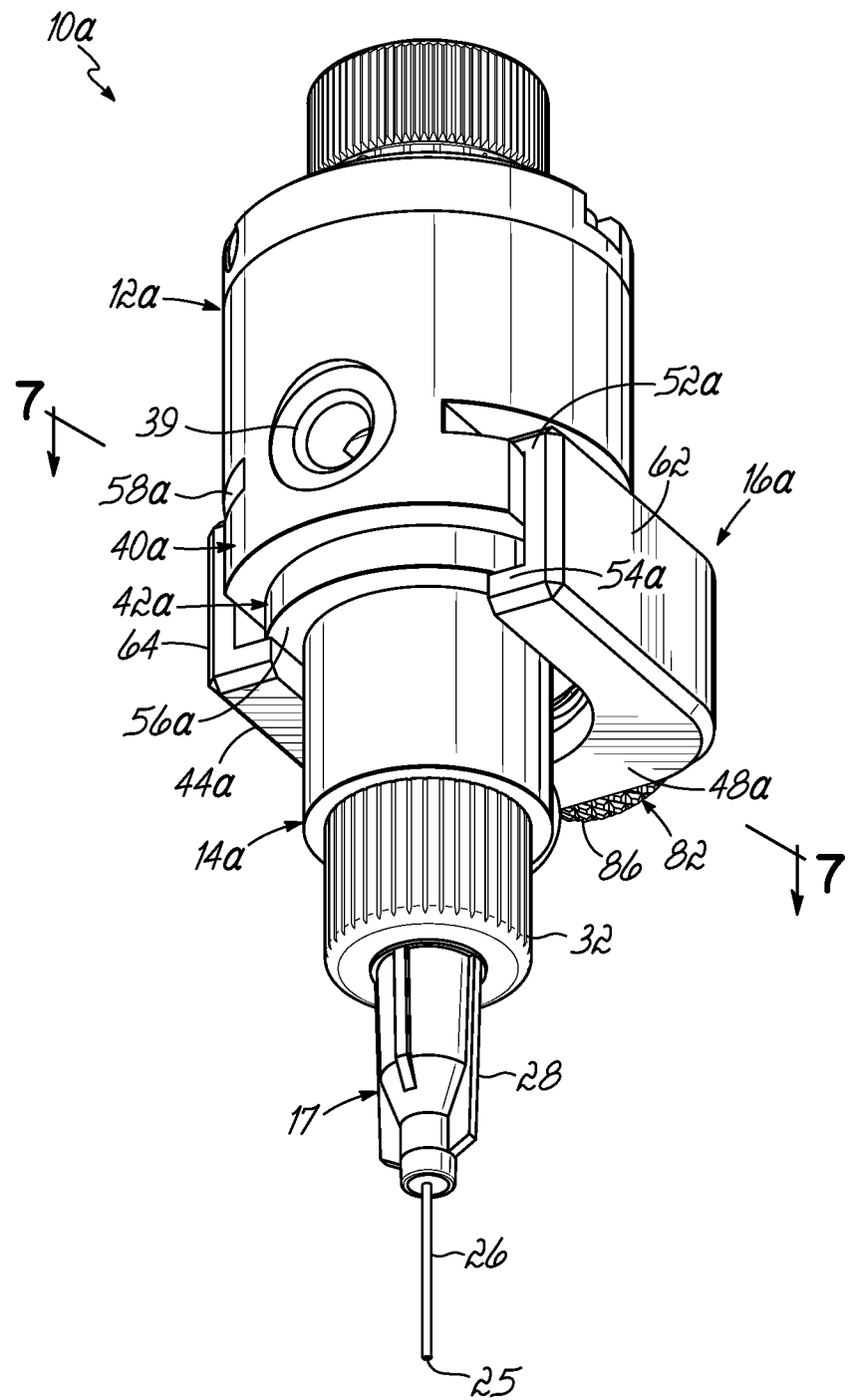
FIG. 6B is a view similar to FIG. 6A, but showing the quick connect member engaged with first and second coupling members on the fluid body and the actuator body of the fluid dispensing apparatus.

FIG. 6B illustrates the fluid dispensing apparatus 10a when the quick connect member 16a is fully engaged with the coupling elements 40a, 42a. Once the quick connect member 16a is fully engaged, the actuator body 12a and the fluid body 14a are connected with respect to one another and are ready to be used in a dispensing operation.

Figure 7:
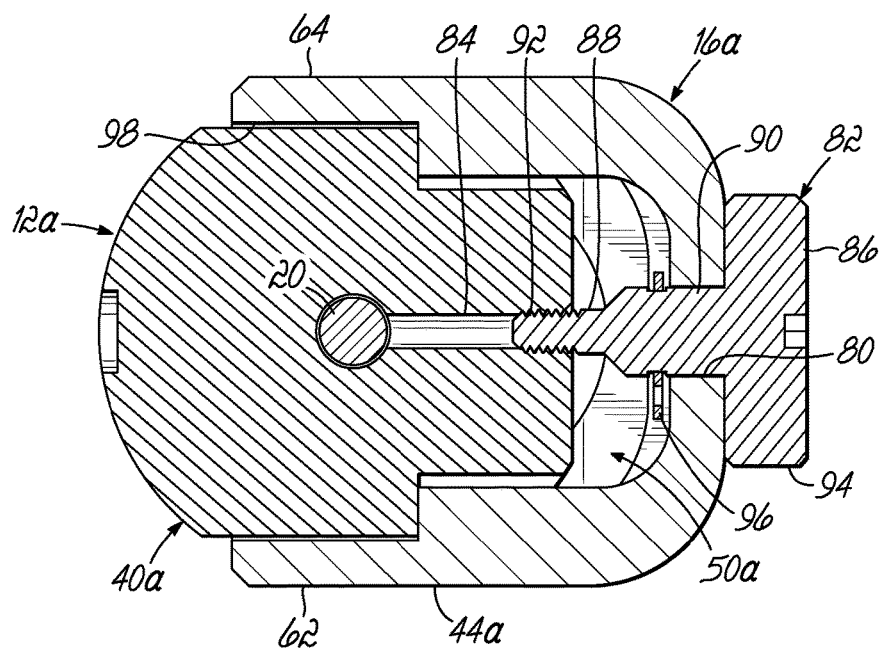
FIG. 7 is cross-sectional view of the fluid dispensing apparatus taken generally along the line 7-7 of FIG. 6B.

Referring to FIG. 7, when the quick connect member 16a is fully engaged with the coupling elements 40a, 42a, the bore 84 securely holds the bolt 82 so that the quick connect member 16a does not inadvertently disengage from the coupling elements 40a, 42a. In other words, the interaction between the bolt 82 and the bore 84 (threaded engagement in the illustrated embodiment) is operable to prevent the quick connect member 16a from disengaging the coupling elements 40a, 42a without an intentional disengaging force being applied on the bolt 82, such as by hand.

In the illustrated embodiment, the bolt 82 includes a head 86 and a pin 88. The pin 88 includes a proximal end 90 and a distal end 92. The proximal end 90 is connected to the head 86, and the aperture 80 is sized to enable the distal end 92 of the pin 88 to extend into the interior 50a of the slidable element 44a while preventing the head 86 from entering the interior 50a of the slidable element 44a. To this end, the head 86 may include a radial portion 94 that is adjacent to and larger than the aperture 80, which prevents the head 86 from moving through the aperture 80 into the interior 50a. The radial portion 94 may be knurled or otherwise contoured on an outer portion to enhance a user's grip when manually connecting or disconnecting the quick connect member 16a. The bolt 82 may further include a stopping ring 96 that is fixed to the pin 88 in the interior 50a adjacent to the aperture 80. The stopping ring 96 is operable to prevent the distal end 92 of the pin 88 from withdrawing from the interior 50a through the aperture 80, such as when the quick connect member 16a is being disengaged from the coupling elements 40a, 42a.

The head 86 is configured to be operable by hand to secure and unsecure the quick connect member 16a to the coupling element 40a, 42b that includes the bore 84 (e.g., coupling element 40a in the version shown in FIG. 7). In this way, the quick connect member 16a may be engaged and disengaged with the coupling elements 40a, 42a without using a specialized or standard tool. In one example, the distal end 92 of the pin 88 is operable to threadably engage the bore 84 when the quick connect member 16a is engaged with the coupling elements 40a, 42a. Under this configuration, engaging the quick connect member 16a with the coupling elements 40a, 42a includes moving the quick connect member 16a towards the coupling elements 40a, 42a and also rotating the bolt 82 by hand so that the pin 88 threadably engages the bore 84. Similarly, disengaging the quick connect member 16a from the coupling elements 40a, 42a includes moving the quick connect member 16a away from the coupling elements 40a, 42a and rotating the bolt 82 in the opposite direction so that the pin 88 threadably disengages the bore 84. Such movements towards and away from the coupling elements 40a, 42a may be continuous and linear in a direction generally perpendicular to the shared axis of the coupling elements 40a, 42a.

Although the bolt 82 and the bore 84 are described herein as being operable to threadably engage one another, it will be understood that other interactions may be used so as to allow the bore 84 to securely hold the bolt 82. For example, the bore 84 may include a sleeve made of a flexible, resilient material that is operative to releasably secure the bolt 82 within the bore 84 when the quick connect member 16a engages the coupling elements 40a, 42a. Alternatively, the bore 84 may include a snap mechanism operable to snap, and thus releasably secure, the bolt 82 into the bore 84. Moreover, the other coupling element 42a may include the bore 84 in other embodiments.

Figure 8:
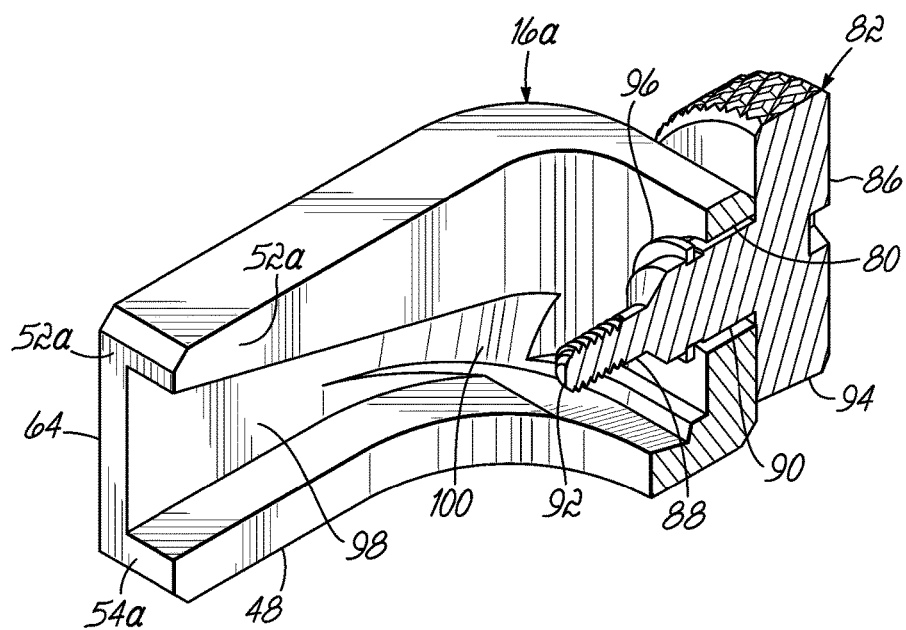
FIG. 8 is a cross-sectional view of the quick connect member taken generally along the line 8-8 of FIG. 6A.

Referring to FIG. 8, the quick connect member 16a may include an inner wall 98 that at least partially defines the interior 50a and extends between the upper tongue 52a and the lower tongue 54a. The inner wall 98 may include portions corresponding to the outer shape of coupling elements 40a, 42a and, in this way, may be operable to closely receive the coupling elements 40a, 42a. For example, in the illustrated embodiment, the coupling elements 40a, 42a are generally circular. Accordingly, the inner wall 98 includes at least one curved portion 100 that corresponds to and closely fits the coupling elements 40a, 42a when the quick connect member 16a is engaged with the coupling elements 40a, 42a.

The fluid dispensing apparatus 10, 10a described herein enables a user to quickly and easily connect and disconnect the fluid body 14 and the actuator body 12 with respect to one another, such as for cleaning, repair, replacement, or other maintenance. For example, a user may connect and disconnect the fluid body 14 and the actuator body 12 via straightforward movements of the quick connect member 16 by hand. Moreover, the fluid body 14 may be connected and disconnected from the actuator body 12 without first dismounting the actuator body 12, and without first removing/ disconnecting the nozzle 17 or other ancillary equipment from the fluid body 14. By reducing the time spent disconnecting and connecting the actuator body 12 and the fluid body 14, the fluid dispensing apparatus 10 described herein ultimately reduces manufacturing down time when such a disconnection or connection is needed.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The features disclosed herein may be combined in any manner depending on the desired aspects of the system or method. The invention in its broader aspects is therefore not limited to the specific details, representative methods, and illustrative examples shown and described. Accordingly, departures may be made from such details without departing from the spirit or scope of applicant's general inventive concept.

What is claimed is:

1. An apparatus for dispensing a fluid from a fluid supply, the apparatus comprising:
    an actuator body;
    an actuator at least partially mounted within the actuator body;
    a valve stem coupled for movement with the actuator;
    a fluid body including a fluid chamber capable of fluid communication with the fluid supply and with an outlet, the valve stem extending from the actuator body into the fluid chamber when the actuator body and the fluid body are connected, for dispensing the fluid from the fluid chamber through the outlet;
    a first coupling element on the actuator body;
    a second coupling element on the fluid body; and
    a quick connect member having a slidable element having an open end and a closed end and an interior extending between the closed end and the open end, the open end being adapted to receive the first and second coupling elements, the slidable element being configured to move in a substantially linear and continuous manner and to selectively fully engage and fully disengage the first and second coupling elements with one another to connect and disconnect the actuator body and the fluid body with respect to each other,
    wherein at least one of the first coupling element and the second coupling element comprises a biasing member adapted to bias the fluid body away from the actuator body when the quick connect member is engaged with the first and second coupling elements,
    wherein the slidable element includes a detent adapted to compress the biasing member during movement of the quick connect member between positions that engage and disengage the first and second coupling elements, such that frictional resistance to the movement of the quick connect member between positions is increased, and
    wherein at least one of the first coupling element and the second coupling element includes a bore, the closed end of the slidable element defines an aperture, and the quick connect member includes a threaded fastener extending through the aperture into the interior of the slidable element, the bore being operable to receive the threaded fastener to further secure the quick connect member to the at least one of the first coupling element and the second coupling element at the bore when the quick connect member is engaged with the first and second coupling elements.

2. The apparatus of claim 1, wherein the quick connect member is further configured to engage the first and second coupling elements in response to a first movement of the quick connect member from a first position to a second position, and to disengage from the first and second coupling elements in response to a second movement of the quick connect member from the second position to the first position.

3. The apparatus of claim 1, wherein the slidable element is U-shaped.

4. The apparatus of claim 1, wherein the quick connect member further comprises a handle extending from the closed end of the slidable element, the handle being operative to facilitate engagement and disengagement of the quick connect member with the first and second coupling elements by hand.

5. The apparatus of claim 1, wherein the interior extending between the closed end and the open end and is delimited by an upper tongue and a lower tongue, the upper tongue and the lower tongue being adapted to engage the first and second coupling elements respectively.

6. The apparatus of claim 5, wherein each of the first coupling element and the second coupling element comprises a beveled surface or a groove, the beveled surface or the groove of the first coupling element and the second coupling element being adapted to contact the upper tongue and the lower tongue of the slidable element, respectively.

7. The apparatus of claim 5, wherein at least one of the upper tongue and the lower tongue of the slidable element includes an entry beveled surface adapted to facilitate engagement of the quick connect member with the first and second coupling elements when the first and second coupling elements are not approximated with each other upon initial engagement of the quick connect member.

8. The apparatus of claim 1, wherein the threaded fastener includes a handle operable by hand and a pin having a proximal end connected to the handle and a distal end, the bore being adapted to threadably engage the distal end of the pin, and the aperture being operative to enable the distal end of the pin to extend into the interior of the slidable element while preventing the handle from entering the interior of the slidable element.

9. The apparatus of claim 1, wherein one of the first coupling element and the second coupling element comprises a stopper, and the other of the first coupling element and the second coupling element includes a mating structure including at least one of distinct sides and distinct protrusions, such that one of the distinct sides or distinct protrusions is positioned adjacent to the stopper and is configured to prevent rotational relative movement of the mating structure and the stopper when the quick connect member is fully engaged with the first and second coupling elements, thereby to prevent the actuator body and the fluid body from rotating relative to each other when the quick connect member is fully engaged with the first and second coupling elements.

* * * * *